(12) United States Patent
Tsuge

(10) Patent No.: US 6,710,499 B2
(45) Date of Patent: Mar. 23, 2004

(54) AC GENERATOR HAVING AIR PORT IN SLIP RING COVER

(75) Inventor: Takafumi Tsuge, Ena (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/085,408

(22) Filed: Mar. 1, 2002

(65) Prior Publication Data

US 2002/0140314 A1 Oct. 3, 2002

(30) Foreign Application Priority Data

Mar. 29, 2001 (JP) ............................... 2001-96916
Dec. 17, 2001 (JP) ............................... 2001-383520

(51) Int. Cl.⁷ .................. H01R 39/08; H02K 9/28; H02K 9/00
(52) U.S. Cl. ................. 310/232; 310/59; 310/88; 310/227
(58) Field of Search .............. 310/232, 62, 59, 310/63, 88, 89, 227

(56) References Cited

U.S. PATENT DOCUMENTS

| | | | |
|---|---|---|---|
| 4,499,390 A | | 2/1985 | Iwaki et al. .................. 310/88 |
| 4,626,720 A | * | 12/1986 | Fukasaku et al. ............. 310/89 |
| 5,047,678 A | * | 9/1991 | Ogawa ......................... 310/88 |
| 5,424,600 A | * | 6/1995 | Ishikawa et al. .............. 310/59 |
| 6,294,856 B1 | | 9/2001 | Ishida et al. ................ 310/232 |

FOREIGN PATENT DOCUMENTS

| | | | | |
|---|---|---|---|---|
| DE | 19950126 A1 | * | 5/2000 | ............ H02K/9/00 |
| FR | 2 785 467 A | | 5/2000 | ........... H02K/13/00 |
| JP | A 60-2051 | | 1/1985 | ................. 310/159 |
| JP | A 60-5750 | | 1/1985 | ................. 310/159 |
| JP | 4-79224 B2 | | 12/1992 | |

* cited by examiner

Primary Examiner—Thomas M. Dougherty
Assistant Examiner—J. Aguirrechea
(74) Attorney, Agent, or Firm—Oliff & Berridge, PLC

(57) ABSTRACT

An AC generator for a vehicle has a brush unit. The brush unit comprises a brush held in sliding contact with a slip ring, a spring for pressing the brush, a brush holder having a portion for receiving the brush, and a slip ring cover for covering the outer periphery of the slip ring formed on a rotary shaft. The slip ring cover includes a first wall portion and a second wall portion which are generally shaped like an arc, a cover portion for closing the end portion in the axial direction, and a side wall portion. The first wall portion and the second wall portion overlaps each other, and a suction/discharge port is formed between these wall portions.

35 Claims, 6 Drawing Sheets

AC GENERATOR HAVING AIR PORT IN SLIP RING COVER

CROSS REFERENCE TO RELATED APPLICATIONS

This application is based on and incorporates herein by reference Japanese Patent Applications No. 2001-96916 filed Mar. 29, 2001 and No. 2001-383520 filed Dec. 17, 2001.

FIELD OF THE INVENTION

The present invention relates to an AC generator for a vehicle mounted on a passenger car, a truck and the like.

BACKGROUND OF THE INVENTION

In an AC generator for a vehicle, cooling air is introduced into the sliding contact portion between slip rings and brushes to prevent foreign matters such as water, oil and the like from entering that portion.

In a brush unit disclosed in JP-B2-4-79224, an opening in the axial direction of a cylindrical slip ring cover fitted in a brush holder is closed by a sealing rubber, which has an air passage communicating with the sliding contact portion between the slip ring and the brush. In this structure, the sealing rubber is pressed onto and made to abut against the edge portion of the slip ring cover in an elastically deformed state by a rear cover, thereby securing hermetic sealing around the slip ring.

In this brush unit, because of variations in the shapes of components such as a rear cover, a slip ring cover and the like, the sealing rubber can not uniformly be pressed onto the edge portion of the slip ring cover, so that it is difficult to secure stable hermetic sealing. Further, since the sealing rubber is elastically deformed, an air passage area formed by the sealing rubber is reduced to cause a shortage of cooling air passing through the sliding contact portion between the slip ring and the brush.

In another brush unit disclosed in U.S. Pat. No. 6,294,856 (JP-A-2000-139058), a depression is formed on a brush holder and in which a partitioning portion formed on a slip ring cover is inserted into the depression to form a bent air passage communicating with the sliding contact portion of a slip ring. Since it has a labyrinth structure at the end portion in the axial direction, its size in the axial direction needs to be increased so as to secure a desired amount of suction air, which is contrary to a recent request for a reduction in size.

SUMMARY OF THE INVENTION

It is an object of the present invention to provide an AC generator for a vehicle capable of securing sufficient hermetic sealing and a sufficient amount of cooling air around a slip ring and of reducing the size of a brush unit.

According to the present invention, an AC generator for a vehicle has a rotor and a brush unit. The rotor has a rotary shaft, a field winding, and a slip ring provided on one end of the rotary shaft and electrically connected to the field winding. The brush unit has a brush held in sliding contact with the slip ring, a spring for pressing the brush, a brush holder having a portion for receiving the brush, and a slip ring cover for covering the outer periphery of the slip ring. An air suction/discharge port is formed in a peripheral direction of the slip ring cover. With the suction/discharge port thus formed, when the brush unit is assembled into the AC generator, it is possible to prevent the suction/discharge port from being deformed and thus an air passage area from being reduced, which results in securing a sufficient amount of cooling air.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
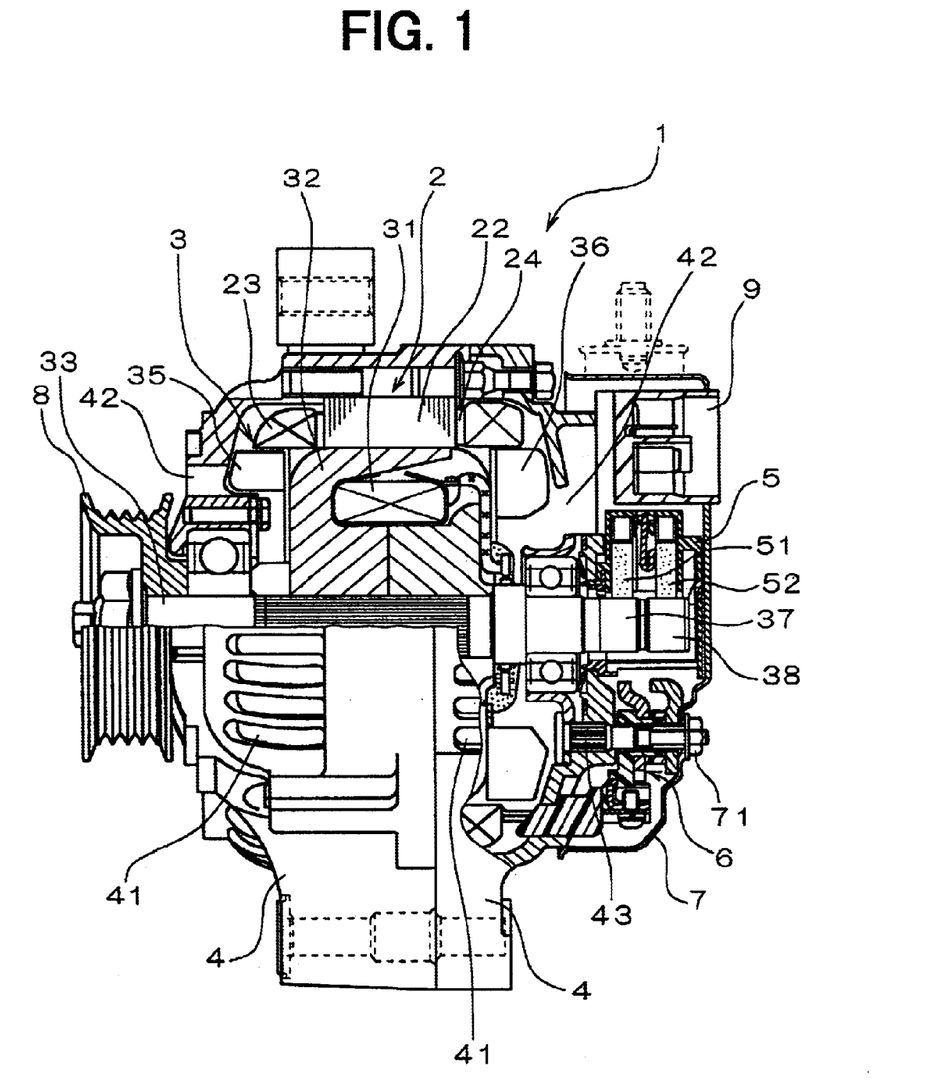
FIG. 1 is a cross-sectional view of an AC generator for a vehicle in accordance with one preferred embodiment of the present invention.

Referring first to FIG. 1, an alternating current (AC) generator 1 is constructed with a stator 2, a rotor 3, frames 4, a brush unit 5, a rectifier 6, a rear cover 7 and the like.

The stator 2 is provided with a stator core 22, a three-phase stator winding 23, and an insulator 24 for electrically insulating the stator core 22 from the stator winding 23.

The rotor 3 is provided with a field winding 31 and pole cores 32. The field winding is formed by winding an insulated copper wire cylindrically and coaxially and is sandwiched from both sides by the pole cores 32. Each pole core 32 has six claws with a rotary shaft 33 inserted into the radial center thereof.

Further, a cooling fan 35 for discharging cooling air sucked from the front side in the axial direction and in the radial direction is mounted by welding on the axial end surface of the pole core 32 on the front side. Similarly, a cooling fan 36 for discharging cooling air sucked from the rear side in the radial direction is mounted by welding on the axial end surface of the pole core 32 on the rear side. Further, two slip rings 37 and 38 are formed in the vicinity of the axial end portion on the rear side of the rotary shaft 33. The slip rings 37 and 38 are electrically connected to both ends of the field winding 31 so that electricity is supplied to the field winding 31 from the brush unit 5.

The frames 4 receive the stator 2 and the rotor 3. The rotor 3 is rotatably supported about the rotary shaft 33. The stator 2 is arranged and fixed on the outer peripheral side of the pole core 32 of the rotor 3 with a predetermined gap therebetween. Further, the frame 4 has cooling air discharging windows 41 at the portion opposite the stator winding 23 projected from the end surface in the axial direction of the stator core 22 and cooling air sucking windows 42 at the end surface in the axial direction.

The brush unit 5 is provided to pass an exciting current through the field winding 31 of the rotor 3 from a rectifier 6 and has brushes 51 and 52 pressed on the slip rings 37 and 38 formed on the rotary shaft 33 of the rotor 3. The rectifier 6 a three-phase AC voltage, which is generated as the output voltage of three-phase stator winding 23, to produce a direct current output power.

The rear cover 7 covers and protects the brush unit 5, the rectifier 6, an IC regulator 9 and the like which are mounted on the outside of the rear side frame 4. This rear cover 7 is fastened to a bolt 43 extending from the rear side frame 4 with a metal nut 71 in the state where the rectifier 6 is sandwiched between the rear side frame 4 and the rear cover 7.

In the AC generator 1, when a rotational force is transmitted to a pulley 8 from an engine (not shown) via a belt or the like, the rotor 3 rotates in a predetermined direction. When an exciting current is supplied in this state to the field winding 31 of the rotor 3 from the outside, the respective claws of the pole cores 32 are excited to generate a three-phase AC voltage in the stator winding 23 to output a direct current from an output terminal provided on the rectifier 6.

The brush unit 5 comprises, as shown in FIG. 2 through FIG. 7, a brush holder 60 which is made of resin and in which connection terminals 61 and 62 are buried, a pig tail 63 for electrically connecting the pair of brushes 51 and 52 to the connection terminals 61 and 62, a slip ring cover 70 made of resin, and the springs 64 and 65.

Figure 3:
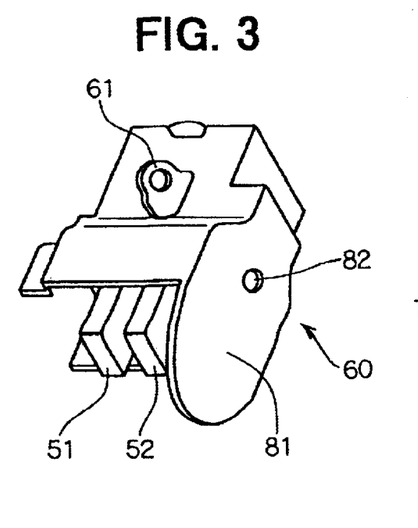
FIG. 3 is a perspective view of a brush holder used in the brush unit shown in FIG. 2.

The brush holder 60 is generally shaped in a box and has openings of brush receiving portions 66, 67, pig tail receiving portions 68, 69 and a radial groove, into which the extending portion 73 of a cover portion 72 of the slip ring cover 70, in the side opposed to the slip rings 37 and 38. Further, on the brush holder 60 is formed a cover portion 81 for closing the end portion in the axial direction at the rear end (side end portion opposite to the pulley) of the rotary shaft 33.

Figure 2:
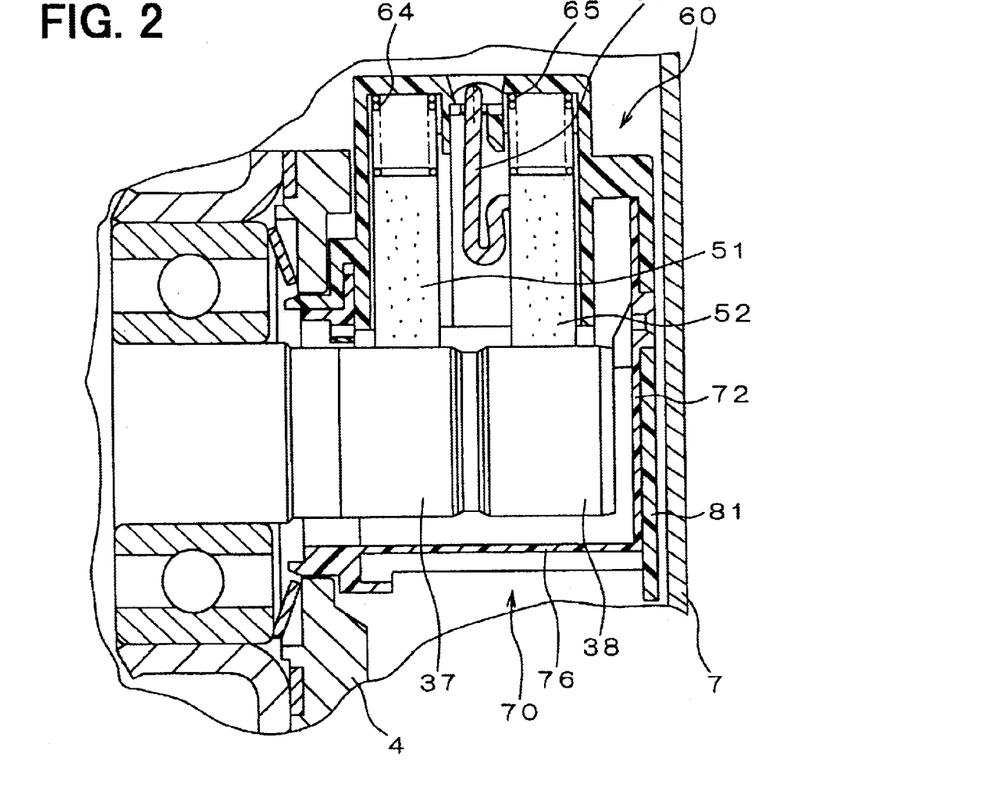
FIG. 2 is an enlarged cross-sectional view of a brush unit used in the AC generator shown in FIG. 1.

The pig tail 63 is connected and fixed to the brushes 51 and 52 by caulking copper power and is soldered to the connection terminals 61 and 62 buried in the brush holder 60 at the end portion in the radial direction, thereby being electrically connected to the other parts (the rectifier 6 and the IC regulator 9) connected to the connection terminals 61 and 62. The brushes 51 and 52 are pressed onto the slip rings 37 and 38 by the springs 64 and 65 arranged at the back end thereof (on the side opposite to the slip ring).

The brush holder 60 and the slip ring cover 70 are combined with each other by fitting a projecting portion 74 formed on the cover portion 72 at the axial end of the slip ring cover 70 into an opening 82 formed in the cover portion 81 closing the axial end of the brush holder 60. These projecting portion 74 and the opening 82 form a fitting portion and the use of such a fitting portion makes it easy to fixedly assemble the brush holder 60 into the slip ring cover 70, which can improve workability in assembling and tightness.

Figure 4:
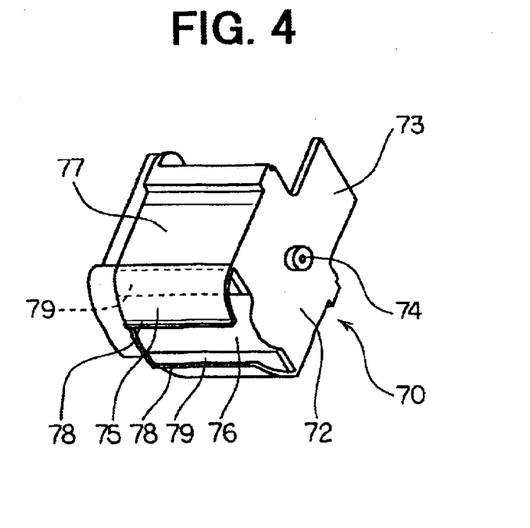
FIG. 4 is a perspective view of a slip ring cover used in the brush unit shown in FIG. 2.
Figure 5:
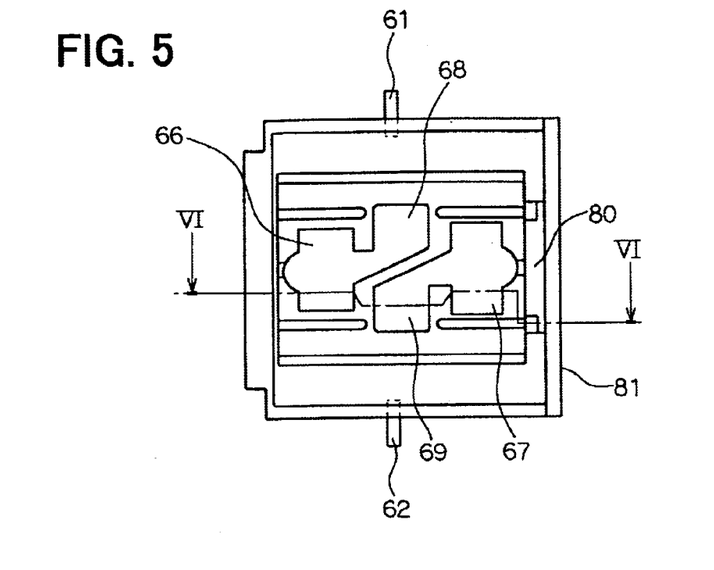
FIG. 5 is a plan view of the brush holder viewed in the radial direction.
Figure 6:
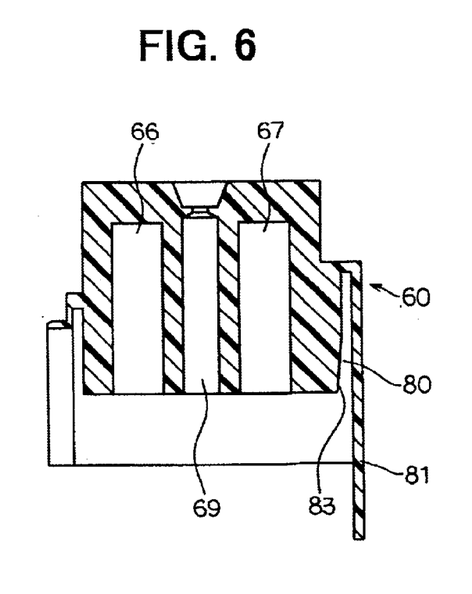
FIG. 6 is a cross-sectional view of the brush holder taken along line VI—VI in FIG. 5.
Figure 7:
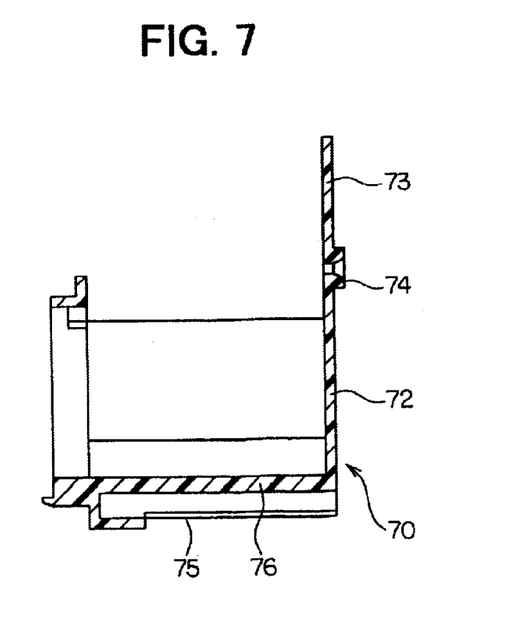
FIG. 7 is a cross-sectional view of the slip ring cover shown in FIG. 4.

The slip ring cover 70 comprises the first wall portion 75, the second wall portion 76 which are nearly shaped like an arc and a side wall portion 77 in addition to the cover portion 72. The cover portion 72 is formed so as to close the axial end portion at the rear end of the rotary shaft 33.

The second wall portion 76 is arranged inside the first wall portion 75 and overlaps the first wall portion 75 in the peripheral direction. Thus, it has air suction/discharge ports 79 in the peripheral direction. That is, the suction/discharge ports 79 each are formed at a portion of the second wall portion 76 and the first wall portion 75 is formed so as to cover the suction/discharge ports 79 to thereby prevent foreign matters from entering the suction/discharge ports 79. Further, a part of the cover portion 81 of the brush holder 60 extends to the first wall portion 75 and closes a gap formed at the axial end side between the second wall portion 76 and the first wall portion 75, thereby preventing the foreign matters from entering the suction/discharge port 79 through the gap.

Further, the first wall portion 75 has an opening formed in a space communicating with the suction/discharge ports 79 and a projecting portion 78 facing outward in the radial direction is formed along the edge of the opening. The direction of travel of the foreign matters entering the opening along the outer periphery of the first wall portion 75 is changed by the projecting portion 78.

Further, the foregoing suction/discharge port 79 is so formed as to face nearly toward the ground in the state where the AC generator 1 is mounted on the vehicle. This can reliably prevent the entry of water drops which become the most significant problem.

Still further, the cover portion 72 of the slip ring cover 70 has an extending portion 73 extending in the radial direction. Then, the extending portion 73 is inserted into the radial groove 80 formed in the brush holder 60 and the cover portion 72 is made to abut against the cover portion 81 to thereby prevent the entry of the foreign matters from the axial end portion. Further, in order to more easily insert the extending portion 73 into the radial groove 80, a tapered surface 83 is formed in the radial groove 80 in the brush holder 60.

In the brush unit 5, a cylindrical portion formed at the frame side end portion by the brush holder 60 and the slip ring cover 70 is fitted into the center hole, which is formed in the rear side frame 4 to pass the rotary shaft 33, with a small gap. This can secure water tightness at this portion.

Since the suction/discharge ports 79 are formed in the peripheral direction of the slip ring cover 70 in this manner, when the brush unit 5 is assembled into the AC generator 1, it is possible to prevent the suction/discharge ports 79 from being deformed and thus an air passage area from being reduced, which results in securing a sufficient amount of cooling air. Further, even if the suction/discharge ports 79 each having a sufficient area are formed, they are not increased in size in the axial direction, so that it is possible to reduce the size of the brush unit 5.

Still further, since the suction/discharge ports 79 are formed without the use of a sealing rubber, it is possible to prevent that an unnecessary gap might be formed between suction/discharge port 79 and the sealing rubber, depending on the state where the brush unit 5 is assembled into the AC generator, and therefore to secure sufficiently hermetic sealing around the slip rings 37 and 38.

In particular, since the suction/discharge ports 79 are formed between the first wall portion 75 and the second wall portion 76, the second wall portion 76 can block the foreign matters entering when the cooling air is sucked and therefore can surely prevent the entry of the foreign matters.

Further, since the second wall portion 76 overlaps the first wall portion 75 in the peripheral direction and covers the suction/discharge ports 79, the space communicating with the suction/discharge ports 79 from the outside can be made to have a labyrinth structure and thus can further surely prevent the entry of the foreign matters.

The above embodiment may be modified in various ways. For example, in consideration of the conditions of the vehicle such as the state where the AC generator 1 is mounted on the vehicle and the direction in which water splashes on the vehicle, the first wall portion 75 and the second wall portion 76 may be properly changed in position to thereby properly change the positions of the suction/discharge ports 79.

Figure 8:
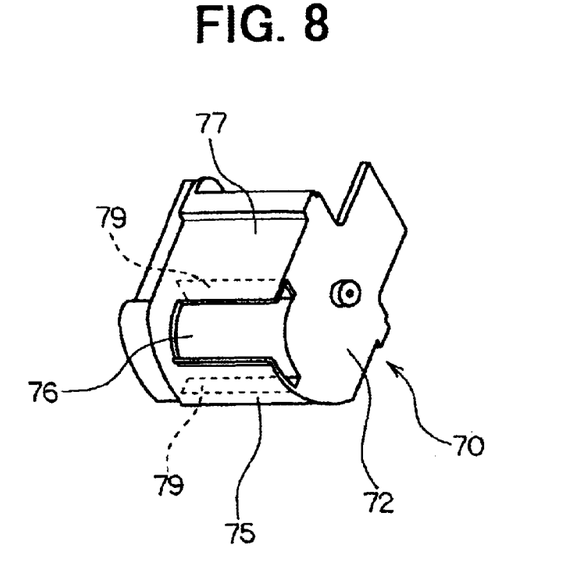
FIG. 8 is a perspective view of a modified slip ring cover used in the brush unit shown in FIG. 2.

The slip ring cover 70 may be so modified as shown in FIG. 8. In this modification, the positions of the first wall portion 75 and the second wall portion 76 are changed in the peripheral direction, whereby the position of the suction/discharge ports 79 are changed in the peripheral direction.

Figure 9:
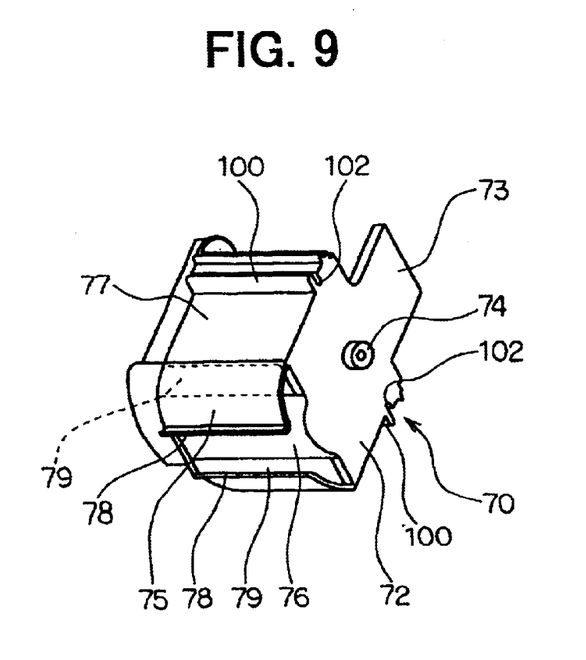
FIG. 9 is a perspective view of another modified slip ring cover used in the brush unit shown in FIG. 2.

Further, the slip ring cover 70 may be modified as shown in FIG. 9. In this modification, rib-shaped projections 100 and grooves 102 which are both formed on the slip ring cover 70 abutting against the brush holder 60. On the side wall portion 77 of the slip ring cover 70 are formed the rib-shaped projections 100 and the grooves 102 both extending in the direction perpendicular to the direction of insertion of the slip ring cover 70 into the brush holder 60.

Since the slip ring cover 70 can be assembled into the brush holder 60 in the state where they surely abuts against each other by these projections 100, it is possible to block the foreign matters entering from the gap between the brush holder 60 and the slip ring cover 70 by capillary action. Similarly, since the area where the slip ring cover 70 abuts against the brush holder 60 is divided into a plurality of portions by forming the grooves 12, it is possible to block the foreign matters entering from the gap between the brush holder 60 and the slip ring cover 70 by capillary action.

Here, these rib-shaped projections 100 or the grooves 102 may be formed on all the surfaces of the slip ring cover 70 where the slip ring cover 70 abuts against the brush holder 60. Further, the rib-shaped projections 100 or the grooves 102 may be connected to each other. Still further, only ones of the rib-shaped projections 100 and the grooves 102 may be formed. In particular, even if some of them are formed, the abutting area can be divided into the plurality of portions.

Figure 10:
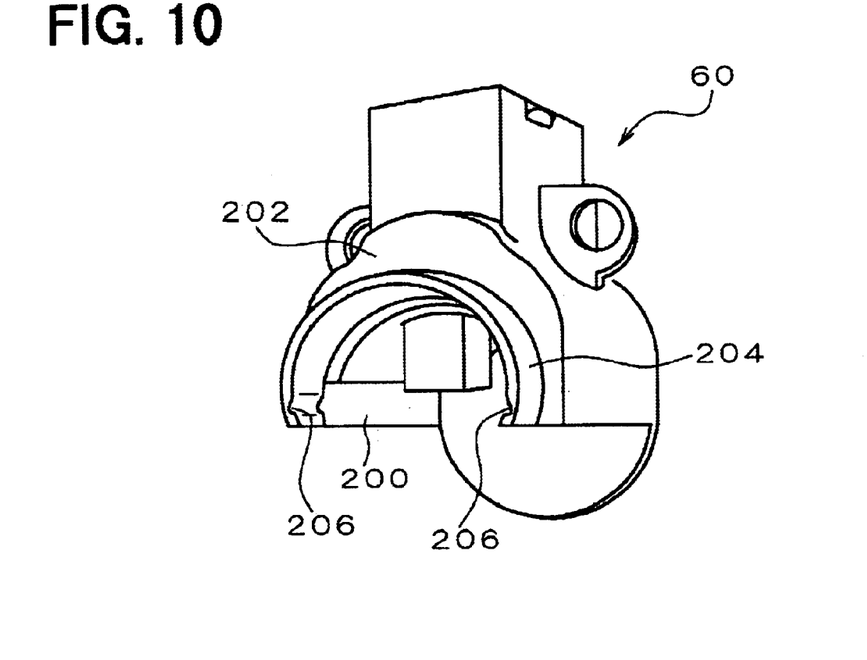
FIG. 10 is a perspective view of a modified brush holder used in the brush unit shown in FIG. 2.
Figure 11:
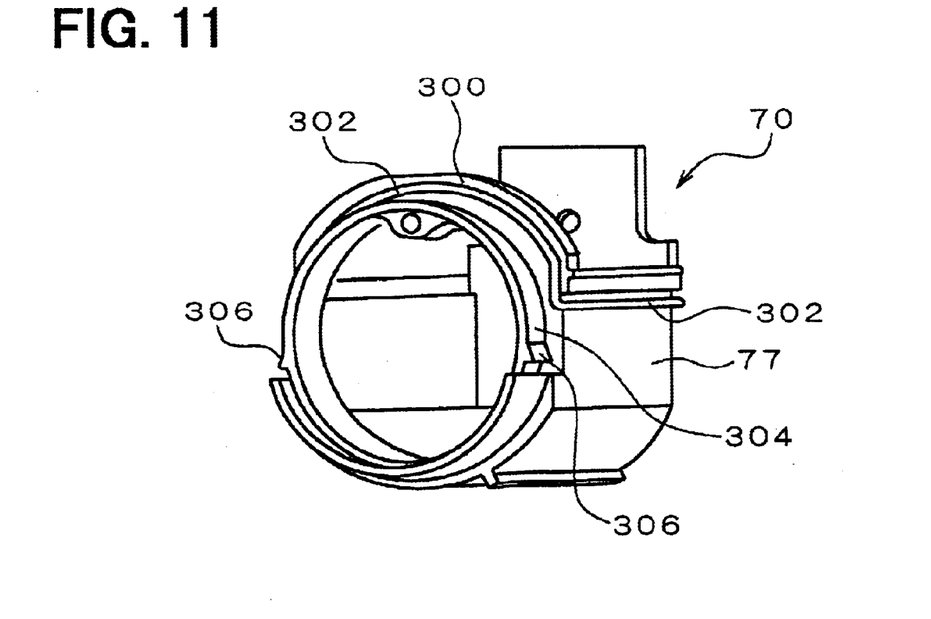
FIG. 11 is a perspective of a further modified slip ring cover used in the brush unit shown in FIG. 2.
Figure 12:
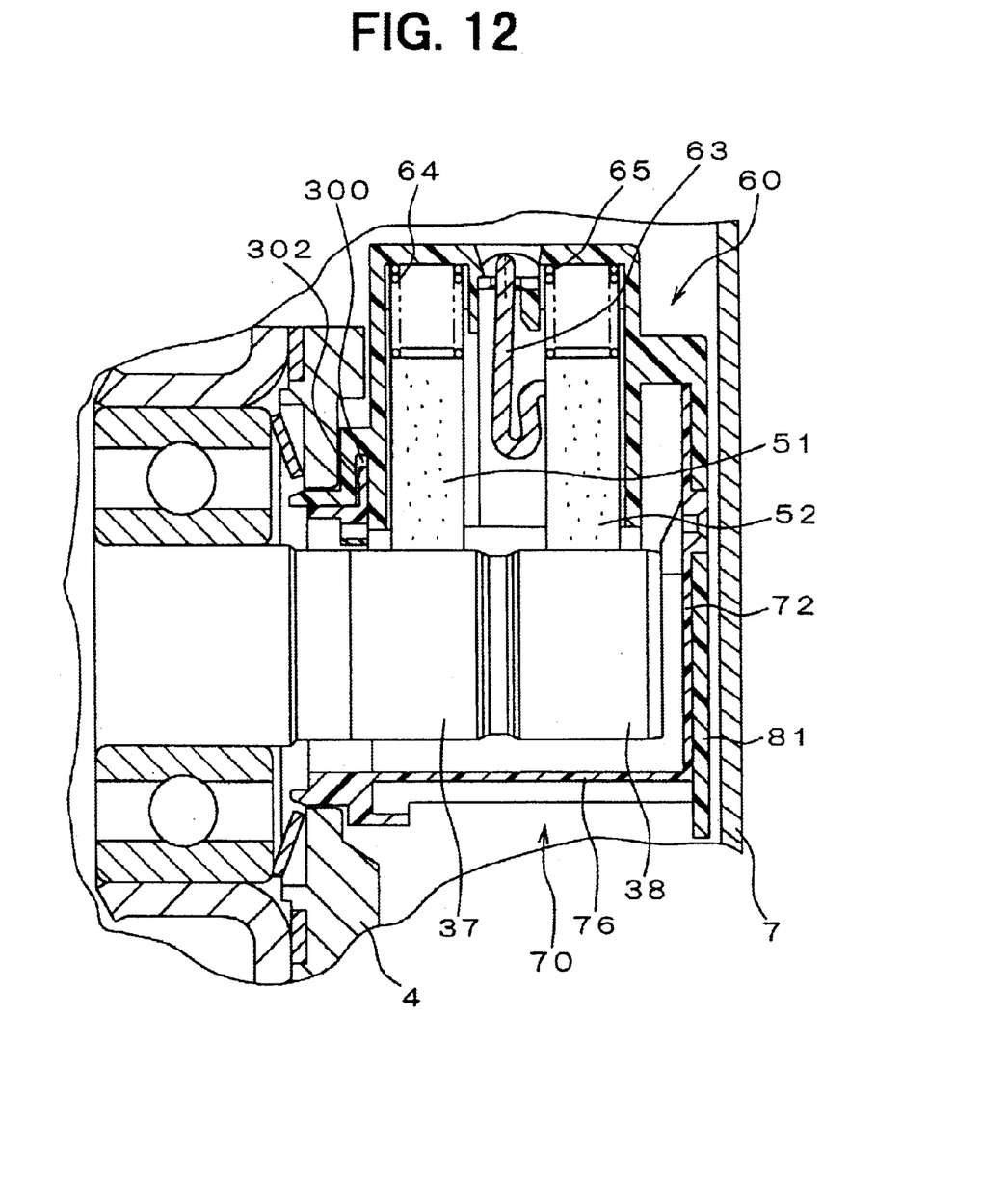
FIG. 12 is an enlarged cross-sectional view of a brush unit including the brush holder shown in FIG. 10 and the slip ring cover shown in FIG. 11.

Still further, the brush holder 60 and the slip ring cover 70 may be modified as shown in FIG. 10 and FIG. 11, respectively. FIG. 10 shows the shape when viewed in the direction in which the brush holder 60 is assembled into the frame 4, and FIG. 11 shows the shape when viewed in the direction in which the slip ring cover 70 is assembled into the frame. These modified brush holder 60 and slip ring cover 70 are assembled as shown in FIG. 12.

As shown in these figures, the brush holder 60 shown and the slip ring cover 70 are formed such that a wall portion 200 extending in the axial direction of the brush holder 60 and a wall portion 202 extending in the radial direction covers a part of the slip ring cover 70. This construction closes the gap formed between the wall portion 202 and the end portion 300 in the axial direction of the slip ring cover 70 and prevents foreign matters from entering through the gap. In particular, if a rib-shaped projection 302 is formed on the sidewall portion 77 of the slip ring cover 77 and the axial end portion 300 (where the slip ring cover 70 is made to abut against the brush holder 60) and is made to abut against the brush holder 60, it is possible to realize a more reliable abutting state.

Further, a depression 206 is formed on a wall portion 204 extending in the axial direction of the brush holder 60 and a projection 306 is formed on a wall portion 304 of the slip ring cover 70 abutting against the wall portion 204. When the projection 306 is fitted in the depression 206 to form a fitting portion, the slip ring cover 70 can be easily assembled into and fixed to the brush holder 60. Therefore, this can improve workability in assembling and hermetic sealing.

The present invention should not be limited to the above embodiment and modifications, but may be implemented in various ways without departing from the spirit of the invention.

What is claimed is:

1. An AC generator for a vehicle, comprising:
    a rotor having a rotary shaft, a field winding, and a slip ring provided on one end of the rotary shaft and electrically connected to the field winding; and
    a brush unit having a brush held in sliding contact with the slip ring, a spring for pressing the brush, a brush holder having a portion for receiving the brush, and a slip ring cover for covering the outer periphery of the slip ring, wherein the slip ring cover has a suction/discharge port and a wall in the suction/discharge port, the wall is shaped to define the suction/discharge port to extend in a peripheral direction of the slip ring and open outside the slip ring cover.

2. The AC generator as in claim 1, wherein the wall has a first wall portion formed in a shape of an arc in cross section perpendicular to the rotary shaft, and a second wall portion formed inside the first wall portion, and the suction/discharge port is formed between the first wall portion and the second wall portion.

3. The AC generator as in claim 2, wherein the first wall portion and the second wall portion overlap in the peripheral direction.

4. The AC generator as in claim 2, wherein the brush holder partially extends to the first wall portion.

5. The AC generator as in claim 2, wherein the first wall portion has an opening made in a space communicating with the suction/discharge port, and a projection facing toward outside in the radial direction is formed along the edge of the opening.

6. The AC generator as in claim 1, wherein the suction/discharge port generally faces toward a ground in a state where the AC generator is mounted on a vehicle.

7. The AC generator as in claim 1, wherein each of the brush holder and the slip ring cover has a cover portion for closing its end portion at one axial end side of the rotary shaft, and the brush holder is mounted on the slip ring cover in the state where these cover portions are made to abut against each other.

8. The AC generator as in claim 7, wherein engaging portions are formed on the cover portions and engaged with each other.

9. The AC generator as in claim 1, wherein the slip ring cover has a side wall portion formed perpendicularly with respect to the direction of the rotary shaft, and at least one of a projection, and a groove are formed on the side wall portion to divide area where the slip ring cover abuts against the brush holder into a plurality of portions.

10. The AC generator as in claim 1, wherein the brush holder and the slip ring cover have a cylindrical portion formed at a frame side end portion, and the cylindrical portion is fitted with a small gap in a center hole made in a frame to which the brush holder is fixed to pass the rotary shaft.

11. The AC generator as in claim 1, wherein an extending portion is formed on at least one of end portions of the slip ring cover in an axial direction to extend in a radial direction, and is inserted into a radial groove formed on the brush holder.

12. The AC generator as in claim 11, wherein the slip ring cover has a rib-shaped projection formed on a surface where the slip ring cover abuts against the brush holder and is made to abut against the brush holder.

13. The AC generator as in claim 1, wherein the slip ring cover is integrally formed with a wall part which extends in the axial direction of the rotary shaft and covers the suction/discharge port partially so that the suction/discharge port is provided within an axial range of the slip ring cover.

14. The AC generator as in claim 1, wherein the wall extends in both the peripheral direction and an axial direction of the slip ring, and the suction/discharge port extends in the axial direction of the slip ring.

15. The AC generator as in claim 1, wherein the wall includes an inside wall portion and an outside wall portion provided at different positions in a radial direction of the slip ring to form the suction/discharge port therebetween.

16. The AC generator as in claim 15 wherein the outside wall portion has an end portion extending from the outside, wall portion at a location radially outside the suction/discharge port.

17. The AC generator as in claim 1, wherein the wall has an outside wall portion provided radially outside the suction/discharge port to define an area of the section/discharge port open to the outside, and an inside wall portion provided radially inside the suction/discharge port.

18. The AC generator as in claim 1, wherein the slip ring cover is provided opposite the brush holder with respect to the slip ring in a radial direction of the slip ring.

19. The AC generator as in claim 1, wherein the suction/discharge port is located adjacent the slip ring in a radial direction of the slip ring.

20. The AC generator as in claim 1, wherein the suction/discharge port is located at a position different from a position of the brush in the peripheral direction of the slip ring.

21. The AC generator as in claim 1, wherein the wall extends in both an axial direction and the peripheral direction of the slip ring so that air flows in the peripheral direction over a width corresponding to a width of the brush in the axial direction.

22. The AC generator as in claim 21, wherein the suction/discharge port is in communication with an inside of the slip ring through more than two Openings extending in the axial direction.

23. An AC generator for a vehicle, comprising:
   a rotor having a rotary shaft, a field winding, and a slip ring provided on one end of the rotary shaft and electrically connected to the field winding;
   a brush held in sliding contact with the slip ring;
   a brush holder holding the brush therein;
   a slip ring cover having outer and inner arc-shaped walls arranged radially outside the slip ring to cover the slip ring in both axial and circumferential directions of the slip ring, the outer and inner arc-shaped walls being separated from each other in a radial direction thereby to provide a spacing therebetween which communicates a radial inside of the inner arc-shaped wall and a radial outside of the outer arc-shaped wall.

24. The AC generator as in claim 23, wherein the outer arc-shaped wall has an opening extending in the axial direction of the slip ring, and the inner arc-shaped wall is arranged only radially inside part of the opening while overlapping with end parts of the outer arc-shaped wall in the circumferential direction of the slip ring.

25. The AC generator as in claim 24, wherein the opening is provided in opposing relation to the brush with respect to the slip ring.

26. The AC generator as in claim 25, wherein the inner arc-shaped wall and the opening are positioned on an underside of the slip ring.

27. The AC generator as in claim 23, wherein both the brush holder and the slip ring cover are generally box-shaped and have axial end walls engaged with each other and covering an axial end of the slip ring, one of the axial end walls covering an axial end of the spacing between the outer and inner arc-shaped walls.

28. The AC generator as in claim 27, wherein the outer arc-shaped wall has an opening extending in the axial direction of the slip ring at a side opposite the brush in the radial direction with respect to the slip ring, and the outer arc-shaped wall has a projecting end extending along the opening and projecting radially outward thereby to restrict foreign matter from entering the opening.

29. The AC generator as in claim 23, wherein both the brush holder and the slip ring cover are generally box-shaped and engaged with each other to surround the slip ring and the brush, and both the brush holder and the slip ring have side walls, one of which has ribs projecting toward and contacting the other of the side walls to restrict foreign matter from entering a space between the brush holder and the slip ring cover.

30. The AC generator as in claim 23, wherein both the brush holder and the slip ring cover are generally box-shaped and have openings which face each other, and the outer and inner arc-shaped walls of the slip ring cover are formed in opposition to the opening of the slip ring cover.

31. An AC generator for a vechicle, comprising:
   a rotor having a rotary shaft, a field winding and a slip ring provided on one end of the rotary shaft and electrically connected to the field winding;
   a brush held in sliding contact with the slip ring;
   a brush holder holding the brush therein; and
   a slip ring cover disposed radially outside the slip ring to define jointly with the brush holder an inner space for accommodating the slip ring therein and circumferentially covering the slip ring, wherein the slip ring cover has a wall member defining an air passage that communicates the inner space and an outside of the slip ring cover, and the air passage extends in a circumferential direction of the slip ring.

32. The AC generator as in claim 31, wherein the air passage has a port opening toward the inner space and extending in an axial direction of the slip ring.

33. The AC generator as in claim 32, wherein the port extends over an entire width of the slip ring cover in the axial direction of the slip ring.

34. The AC generator as in claim 31, wherein the wall member has an inner wall and an outer wall located at different positions in a radial direction of the slip ring cover, and the air passage is provided between the inner wall and the outer wall.

35. The AC generator as in claim 34, wherein the outer wall has an opening at a position radially outside the inner wall.

* * * * *